United States Patent [19]
Kricheldorf et al.

[11] Patent Number: 4,861,857
[45] Date of Patent: Aug. 29, 1989

[54] THERMOTROPIC POLYESTERIMIDE FROM N-CARBOXYALKYLENE TRIMELLITIMIDE HAVING EXCELLENT PROCESSIBILITY, A PROCESS FOR THEIR PRODUCTION AND THEIR USE FOR THE PRODUCTION OF MOLDINGS, FILAMENTS, FIBERS AND FILMS

[75] Inventors: Hans-Rytger Kricheldorf; Ralf Pakull, both of Hamburg; Volker Eckhardt; Hans-Rudolf Dicke, both of Krefeld, all of Fed. Rep. of Germany

[73] Assignee: Bayer Aktiengesellschaft, Leverkusen, Fed. Rep. of Germany

[21] Appl. No.: 197,646

[22] Filed: May 23, 1988

[30] Foreign Application Priority Data

Jun. 2, 1987 [DE] Fed. Rep. of Germany ....... 3718396

[51] Int. Cl.$^4$ .............................................. C08G 73/16
[52] U.S. Cl. .................................... 528/170; 528/184; 528/193; 528/289; 528/310; 528/322; 528/350
[58] Field of Search ..................... 528/170, 184, 193

[56]  References Cited
U.S. PATENT DOCUMENTS 3,567,685  3/1971  Bialous et al. .................... 528/170
3,880,812  4/1975  Golonkin et al. ................. 260/78.3

FOREIGN PATENT DOCUMENTS 0076483  4/1983  European Pat. Off. .

OTHER PUBLICATIONS

Patent Abstract of Japan, vol. 3, No. 109 (C-58), 1979, 117 C 58.

Primary Examiner—Harold D. Anderson
Attorney, Agent, or Firm—Connolly and Hutz

[57]  ABSTRACT

Thermotropic polyesterimides based on N-(ω-carboxyalkylene)-trimellitic acid imides and diphenols are distinguished by superior mechanical properties while at the same time being easily processible.

8 Claims, No Drawings

THERMOTROPIC POLYESTERIMIDE FROM N-CARBOXYALKYLENE TRIMELLITIMIDE HAVING EXCELLENT PROCESSIBILITY, A PROCESS FOR THEIR PRODUCTION AND THEIR USE FOR THE PRODUCTION OF MOLDINGS, FILAMENTS, FIBERS AND FILMS

This invention relates to high molecular weight, thermotropic polyesterimides having excellent processibility and good mechanical properties, to a process for their production and to their use for the production of moldings, filaments, fibers and films.

"Thermotropic" materials are materials which form liquid crystal melts. Thermotropic polycondensates are sufficiently well known, cf. for example F. R. McFarlane et al, Liquid Crystal Polymers II, Contemporary Topics in Polymer Science, Vol. 2, Plenum Publishing Corporation, 1977;

W. J. Jackson and H. G. Kuhfuss, J. Polymer Science, Polymer Chem. Ed. 14, 2042 (1976);

W. C. Wooten et al in A. Ciferri "Ultra-high Modulus Polymers", Applied Science Publ., London 1979, pp. 362 et seq;

A. Blumstein et al, "Liquid Crystalline Order in Polymers", Academic Press 1978;

J. Preston, Angew. Makromol. Chem. 109/110 pp. 1–19 (1982);

A. Ciferri, W. R. Krigbaum, R. B. Meyer "Polymer Liquid Crystals", Academic Press, New York 1982;

M. G. Dobb and J. E. McIntyre, Advances in Polym. Sci. 60/61, Springer-Verlag, Berlin 1984;

EP Nos. 1185, 1340, 8855, 11 640, 15 856, 17 310, 18 145, 18 709, 22 344, 44 205, 49 615, 131 846, 132 637, 134 956, 134 959, 141 320, 165 399, 170 935, 189 073; U.S. Pat. Nos. 3,991,013, 3,991,014, 4,066,620, 4,067,852, 4,083,829, 4,107,143;

WO Nos. 79/797, 79/1030, 79/1040.

The liquid crystalline state of polymer melts may be investigated using a polarization microscope. To this end, the eyepiece was fitted with an attachment comprising a photodiode arranged at the focal point of the eyepiece lens. Using a following measuring amplifier with control device and with the microscope switched on, the measured value was adjusted to 100 scale graduations in the absence of a sample with the Nicol prisms arranged parallel. With the Nicol prisms crossed, a value of 0.01 graduation was then obtained.

The layer thickness of the polycondensate melts investigated was 100 μm.

The polycondensates were investigated after the samples had been melted at temperatures of 140° to 400° C. Providing the melt observed between the crossed Nicol prisms lightened throughout this range or in a part thereof, the polycondensate was classified as a thermotropic liquid crystalline.

The liquid crystalline polycondensates show values of more than 1 scale graduation in the measuring arrangement and, generally, values of 3 to 90 scale graduations. By contrast, amorphous melts, for example aromatic polycarbonates, produced values of less than 0.1 graduation.

The method described above is particularly suitable for rapid determination in the laboratory and provides conclusive results in almost every case. In doubtful cases, it can be useful to demonstrate the presence of liquid crystal components by X-ray wide-angle scattering in the melt, as described for example in G. W. Gray and P. A. Windsor, "Plastic Crystals, Physico-Chemical Properties and Methods of Investigation", more particularly Chapter 3, John Wiley & Sons, New York/Sydney, Toronto, 1974.

Moldings produced from a liquid crystal melt of fully aromatic polycondensates show mechanical strengths and stiffness levels which are not normally found in non-reinforced polycondensates processed from an isotropic melt. However, the processibility of such polycondensates is not entirely satisfactory.

DE-OS No. 20 25 971 relates to high molecular weight, fully aromatic polyesters based on p-hydroxybenzoic acid, aromatic dicarboxylic acids (such as terephthalic or isophthalic acid) and diphenols (such as hydroquinone or 4,4'-dihydroxybiphenyl). By virtue of the components used, these polyesters are thermotropic; for example, they may be processed into fibers. Of the 13 polyesters of the Examples, only one melts below 300° C. Accordingly, these polyesters show poor processibility.

DE-OS No. 35 16 427 describes thermotropic polyesterimides based on alkylene-α,ω-bis-trimellitic acid imides and various aromatic dihydroxy compounds. Although these polyesters lend themselves to thermoplastic processing, only one of the pronounced liquid crystalline compositions (i.e. having a mesophase more than 25° C. wide) described in the Examples melts below 300° C.

By contrast, numerous applications, for example in the field of optical electronics, require materials which lend themselves to thermoplastic processing and which show improved mechanical properties compared with conventional thermoplasts processed from the isotropic melt phase.

Accordingly, the object of the present invention is to provide thermoplastic polycondensates which show better processing properties than the polyesters according to DE-OS No. 20 25 971 and the polyesterimides according to DE-OS No. 35 16 427, but which still show superior mechanical properties to conventional thermoplasts.

Preferred new thermotropic polycondensates should be thermoplastically processible at a temperature below 320° C., preferably at a temperature below 300° C. and more preferably at a temperature below 280° C.

In addition, preferred new thermotropic polycondensates should show an E-modulus in tension of at least 3,000 MPa, preferably of at least 5,000 MPa and more preferably of at least 6,000 MPa.

It has now surprisingly been found that polyesterimides containing co-condensed residues of N-(ω-carboxyalkylene)trimellitic acid imides, certain diphenols and, optionally, p-hydroxybenzoic acid show the desired combination of advantageous properties.

The present invention relates to thermotropic polyesterimides containing recurring units corresponding to the following formulae

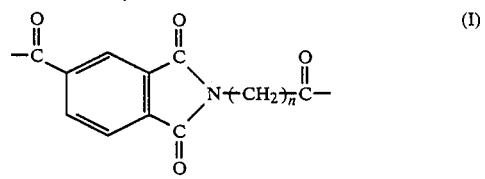

and, optionally,

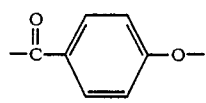

in which n is an integer of 3 to 12, Ar consists of 1,4-phenylene units or 4,4'-biphenylene units or mixtures thereof, up to 50 mol-% of these units being replaceable by other $C_6$-$C_{12}$ divalent aromatic radicals or mixtures thereof, in which 50 to 100 mol-% of the chain-extending bonds are coaxially or parallel opposed and 50 to 0 mol-% angled and which may be substituted by $C_1$-$C_4$ alkoxy groups or halogen atoms, with the proviso that the molar ratio of III to I is 0 to 4.0, preferably 0 to 3.0 and more preferably 0.5 to 3.0 and the molar ratio of I to II is 0.95 to 1.05, preferably 0.98 to 1.02 and more preferably 1.0.

Where diphenols containing unit Ar, of which the chain-extending bonds are angled or which are substituted, are used, the quantity in which they are used will be selected not to exceed the level at which the thermotropic properties of the resulting polyesters are lost.

Preferred diphenols leading to units II, in which Ar is not a 1,4-phenylene unit or a 4,4'-biphenylene unit, are for example, 1,4-, 1,5-, 2,6- and 2,7-naphthalenediol, chlorohydroquinone, methyl hydroquinone, phenyl hydroquinone, resorcinol, bisphenol A, o,o,o',o'-tetramethyl-, -chloro-, -bromobisphenol A, 4,4'-dihydroxybenzophenone, 4,4'-dihydroxydiphenyl sulfide and mixtures of these compounds.

Up to 10 mol-% of the units II in the polyester according to the invention may be replaced by other dicarboxylic acid residues of which the chain-extending bonds are coaxially or parallel opposed or angled. Dicarboxylic acids which lead to such residues are preferably terephthalic acid, isophthalic acid, 4,4'-biphenyl dicarboxylic acid, 4,4'-terphenyl dicarboxylic acid, 2,6-, 1,4-, 1,5-, 2,7-naphthalene dicarboxylic acid, azobenzene dicarboxylic acid, stilbene dicarboxylic acid, tolane dicarboxylic acid, 4,4'-, 3,4'-diphenylether dicarboxylic acid, 4,4'-, 3,4'-benzophenone dicarboxylic acid and methyl, ethyl, phenyl and chloroterephthalic acid.

The polyesters according to the invention may contain up to 10 mol-% carbonate groups, based on the sum of ester and carbonate groups, but are preferably free from carbonate groups.

The polyesters according to the invention may contain the units I and II and the units III in statistical distribution or in blocks.

The polyesters according to the invention may be terminated by —COOH, —H, —OH, —OC$_6$H$_5$, acyloxy or by residues of chain terminators. Preferred chain terminators are monofunctional, aromatic hydroxyl compounds, such as 4-hydroxydiphenyl, p-nonyl phenol, 4-(1,1,3,3-tetramethylbutyl)-phenol, β-naphthol and aromatic monocarboxylic acids, such as dipenyl carboxylic acids and naphthalene carboxylic acids. Chain terminators may be used in quantities of 0.5 to 5 mol-%, based on the sum of the units I and III in the case of carboxylic acids and based on the sum of the units II and III in the case of phenols.

It is also possible to use branching, trifunctional or higher, preferably aromatic monomers in quantities of 0.1 to 1.0 mol-%, based on the sum of the units I, II and III, such as for example phloroglucinol, 1,3,5-benzenetricarboxylic acid and 3,5'-dihydroxybenzoic acid.

The polyesters according to the invention generally have an inherent viscosity of at least 0.3 and preferably of at least 0.6 dl/g, as measured on a solution of 5 mg polyester/ml p-chlorophenol at 45° C. Should polyesters be insoluble in p-chlorophenol, it is assumed that they have the minimum viscosity shown. Accordingly, they correspond to the invention providing they satisfy the parameters of the main claim.

The polyesters according to the invention preferably have a melt viscosity of less than 1,000 Pa.s, as measured at a shear rate of $10^3$ sec$^{-1}$ using a nozzle with a length-to-diameter ratio of 20 and at a temperature of less than 330° C.

The polyesters according to the invention may be produced by various methods, for example by condensation or transesterification of the dicarboxylic acids, diphenols and hydroxycarboxylic acids derived from the units I, II and, optionally, III, or reactive derivatives thereof, and subsequent polycondensation.

Examples of preferred starting compounds are their aryl esters, their acyl esters and their acid chlorides.

In one preferred synthesis process, the lower acyl esters, preferably the acetates, of the diphenols derived from the units II and, optionally, the hydroxycarboxylic acids derived from the units III are reacted with the dicarboxylic acids derived from the units I; the acyl esters may even be prepared in situ.

In another preferred synthesis process, the dicarboxylic acids derived from the units I are produced in situ by reaction of trimellitic anhydride and the corresponding lactam and are reacted without further isolation with the lower acyl esters, preferably the acetates, of the diphenols derived from the units II and, optionally, the hydroxycarboxylic acids derived from the units III ("one-shot process").

These reactions may be carried out in the melt phase, although it is also possible to carry out the reaction in the presence of a liquid heat-transfer medium of high boiling point.

The units I, II and III are incorporated in the polyester in the ratio of the starting components.

It can be useful to accelerate the condensation or transesterification reactions and also the polycondensation reactions by using catalysts. Catalysts suitable for this purpose are known types, for example Lewis acids and hydrohalic acids; oxides, hydrides, hydroxides, halides, alcoholates, phenolates, salts of inorganic or organic acids (preferably carboxylic acid salts), complex salts or mixed salts of the alkaline earth metals, such as for example magnesium, calcium; of secondary group elements, such as for example vanadium, titanium, manganese, cobalt, nickel, zinc, lanthanum, cerium, zirconium or of elements of other groups of the periodic system, such as for example germanium, tin, lead and antimony or even the alkali metals or alkaline earth metals themselves, particularly sodium, sodium hydroxide, lithium acetate, sodium acetate, potassium acetate, calcium acetate, magnesium acetate, cobalt, zinc acetate, calcium benzoate, magnesium acetyl acetonate, zinc acetyl acetonate, vanadyl-$C_1$-$C_8$-alkoxides, titanium alkoxides, such as titanium tetrabutylate, titanium tetrapropylate, alkoxy titanium silicates, zirconium butylate, zirconium propylate, titanium tetraphenolate, sodium phenolate, germanium dioxide, antimony trioxide, dialkyl and diaryl tin oxide, dibutyl tin diacetate, dibutyl dimethoxy tin.

The catalysts are used in quantities of preferably 0.001 to 1% by weight and more preferably 0.01 to 0.2% by weight, based on the total weight of the monomers used.

The polyesters according to the invention may be prepared at temperatures of 150° to 330° C., the reaction generally being started at low temperatures and the temperature being increased continuously as the reaction progresses. If the reaction velocity slackens, a vacuum may be applied, the pressure preferably being reduced continuously from normal pressure to around 0.1 mbar.

The product obtained may be subjected to solid-phase post-condensation in granulate or powder form under reduced pressure at temperatures of 150° to 300° C. After 1 to 25 hours, the molecular weight has increased and the resulting properties of the polyester have significantly improved.

Accordingly, the present invention also relates to a process for the production of the polyesters by reaction of the dicarboxylic acids derived from the units I (which may also be produced in situ from trimellitic anhydride and corresponding lactams) with the diphenols and hydroxycarboxylic acids derived from the units II and, optionally, III, or reactive derivatives thereof (which may also be produced in situ), optionally in the presence of catalysts, chain terminators and branching agents at temperatures of 150° to 330° C. and optionally under reduced pressure.

By virtue of their relatively low melting viscosity, the thermotropic polyesters according to the invention may advantageously be processed from the melt to form injection-molded articles, filaments, fibers, ribbons and films, the shear forces generated producing a molecular orientation which is influenced to a high degree by the intensity of the shear forces. In addition, they show pronounced structural viscosity, i.e. the melt viscosity decreases considerably with increasing shear forces. Suitable processing techniques are injection molding, extrusion, pultrusion, compression molding, thermoforming and melt spinning.

Molded articles of high strength and rigidity, good toughness (particularly at low temperatures), high elongation at break and high dimensional stability can be produced from the polyesters according to the invention. Since, in addition, the polyesters show high resistance to chemicals and high flame resistance, they are particularly suitable for the production of
coverings for light wave guides,
electrotechnical articles, such as for example insulators, printed circuit boards, plugs, coverings for integrated circuits, fittings,
parts of chemical engineering plants, such as for example pipes, vessel linings, rotors, friction bearings, seals, packings,
parts of medical-technical equipment, such as components of air conditioning installations, valve components.

However, the polyesters according to the invention may also be used as a coating material in powder form or dispersion. They are also very suitable for the production of reinforced or filled molding compositions in which the content of filler or reinforcing material is 5 to 65% by weight, based on the reinforced or filled molding composition.

Accordingly, the present invention also relates to the use of the new polyesters for the production of moldings, filaments, fibers and films.

EXAMPLES

Impact strength $a_n$ was determined on standard small bars (10 test specimens) in accordance with DIN No. 53 453 (ISO/R 179) at 23° C. Flexural strength was determined on small test bars in accordance with DIN No. 53 452 (ISO/R 178, three-point bending test). E-modulus in flexure was determined in accordance with DIN No. 53 457. Tensile strength and elongation at break $\epsilon_r$ were measured in accordance with DIN 53 455 (ISO/R 527) and the E-modulus in tension in accordance with DIN No. 53 457.

EXAMPLE 1

The following substances were weighed into a nitrogen-purged, heated 1-liter face-ground vessel with a face-ground cover, a stirrer, a nitrogen inlet and a Vigreux column with distillation attachment:
69.0 g ($\hat{=}$0.500 mol) p-hydroxybenzoic acid,
92.4 g ($\hat{=}$0.246 mol) N-(10-carboxydecamethylene)-trimellitic acid imide,
18.1 g ($\hat{=}$0.165 mol) hydroquinone,
15.3 g ($\hat{=}$0.082 mol) 4,4'-dihydroxydiphenyl,
106.5 g ($\hat{=}$1.043 mol) acetic anhydride,
0.02 g magnesium acetate and
0.02 g germanium dioxide.

The mixture was heated under nitrogen to 180° C. on a salt bath. Most of the acetic acid (approx. 104 g) was then distilled off over a period of 5 hours by gradually increasing the bath temperature to 280° C. To complete the reaction, the pressure was reduced in stages to 18 mbar over a period of another 45 minutes. During this vacuum phase, the viscosity of the polymer melt formed increased considerably. The melt was therefore stirred relativaly slowly. By the end of this phase, a total of 115.4 g acetic acid (contains excess acetanhydride) had been collected.

The beige reaction product, which had an inherent viscosity of 0.86 dl/g (measured as shown in Table 1), was ground and subjected at 220° C. to solid-phase post-condensation (30 hours under a pressure of 1 mbar). The polyesterimide thus obtained was insoluble in p-chlorophenol and showed an optically anisotropic melt phase in the range from 220° to 340° C. To determine the mechanical properties shown below, the product was injection-molded at 250° C. to form standard small test bars and tensile bars.
Impact strength: 31 kJ/m$^2$
E modulus in tension: 7460 MPa
Tensile strength: 100 MPa
Elongation at break: 4.5%
E-modulus in flexure: 4900 MPa
Flexural strength: 100 MPa

EXAMPLE 2

The following substances were weighed into the reaction apparatus desribed in Example 1:
107.8 g ($\hat{=}$0.781 mol) p-hydroxybenzoic acid,
144.2 g ($\hat{=}$0.384 mol) N-(10-carboxydecamethylene)-trimellitic acid imide,
42.4 g ($\hat{=}$0.384 mol) hydroquinone,
166.2 g ($\hat{=}$1.628 mol) acetic anhydride,
0.02 g magnesium acetate and
0.02 g germanium dioxide.

The mixture was heated under nitrogen to 200° C. on a salt bath. Most of the acetic acid was then distilled off over a period of 5.5 hours by gradually increasing the bath temperature to 295° C. To complete the conversion, the pressure was reduced in stages to 20 mbar over a period of another hour, the viscosity of the melt increasing considerably. By the end of this phase, a total of 180.0 g acetic acid (contains excess acetic anhydride) had been collected.

The beige-brown reaction product, which had an inherent viscosity of 1.63 dl/g (measured as shown in Table 1), was ground and subjected to the solid-phase post-condensation described in Example 1. The polyesterimide obtained was insoluble in p-chlorophenol and showed an optically anisotropic melt phase in the range from 240° to 340° C.

Test specimens having the following mechanical properties were made by injection molding at 260° C.:
Impact strength: 27 kJ/m$^2$
E-modulus in tension: 6930 MPa
Tensile strength: 97 MPa
Elongation at break: 4.7%
E-modulus in flexure: 4940 MPa
Flexural strength: 92 MPa

EXAMPLE 3

The following substaces were weighed into the reaction apparatus described in Example 1:
187.5 g (≙0.500 mol) N-(10-carboxydecamethylene)-trimellitic acid imide,
93.0 g (≙0.500 mol) 4,4'-dihydroxydiphenyl,
107.2 g (≙1.050 mol) acetic anhydride,
0.02 g magnesium acetate and
0.02 g germanium dioxide.

The mixture was heated under nitrogen to 200° C. on a salt bath. Most of the acetic acid was then distilled off over a period of 5.5 hours by gradually increasing the bath temperature to 300° C. To complete the reaction, the pressure was reduced in stages to 20 mbar over a period of another 40 minutes, the viscosity of the melt increasing considerably. By the end of this phase, a total of 117.0 g acetic acid (contains residual acetic anhydride) had been collected.

Test specimens having the following mechanical properties were made by injection molding at 295° C.:
Impact strength: 108 kJ/m$^2$
E-modulus in tension: 3640 MPa
Tensile strength: 111 MPa
Elongation at break: 12.0%
E-modulus in flexure: 3470 MPa
Flexural strength: 101 MPa

EXAMPLE 4

The following substances were weighed into a nitrogen-purged, heated melt polycondensation apparatus consisting of a 250 ml face-ground vessel with a face-ground cover, a stirrer, a nitrogen inlet and a Vigreux column with distillation attachment:
29.1 g (≙0.10 mol) N-(4-carboxytetramethylene)-trimellitic acid imide,
19.4 g (≙0.10 mol) hydroquinone diacetate and
0.10 g magnesium oxide.

The mixture was heated under nitrogen for 15 minutes at 220° C., for 15 minutes at 250° C. and for 60 minutes at 280° C. on a salt bath, most of the acetic acid formed distilling off. To complete the reaction, the pressure was reduced in stages to 20 mbar over a period of another 60 minutes, the viscosity of the melt increasing considerably.

The reaction product was purified by dissolution in dichloromethane/trifluoroacetic acid (4:1 parts by weight) and subsequent precipitation in methanol and dried at 80° C./12 mbar (yield: 85% of the theoretical). The polyester imide had an inherent viscosity of 0.33 dl/g (measured as shown in Table 1) and showed an optically anisotropic melt phase in the temperature range from 210° to 320° C.

EXAMPLES 5-9

The polyesterimides listed in Table 1 were prepared by the same method and using the same apparatus as described in Example 4.

TABLE 1

Thermotropic polyesterimides containing N—(carboxyalkylene)-trimellitic acid imide units

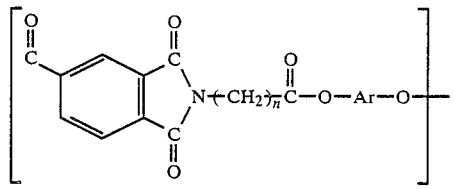

| Example | n | Ar | Yield (%) | Inherent viscosity[1] (dl/g) | Anisotropic phase[2] (°C.) |
|---|---|---|---|---|---|
| 5 | 5 | 1,4-phenylene | 89 | 0.31 | 140-190 |
| 6 | 6 | 1,4-phenylene | 79 | 0.62 | 200-250 |
| 7 | 6 | 4,4'-biphenylene | 83 | 1.02 | 290-340 |
| 8 | 10 | 4,4'-biphenylene | 91 | 0.71 | 230-320 |
| 9 | 11 | 4,4'-biphenylene | 95 | 1.00 | 230-320 |

[1]determined by measurement in p-chlorophenol (T = 45° C., c = 5 g/l)
[2]determined by differential thermal analysis/polarization microscopy The beige-brown reaction product, which had an inherent viscosity of 0.74 dl/g (measured as shown in Table 1), was ground and subjected to the solid-phase post-condensation described in Example 1. The polyesterimide thus obtained was insoluble in p-chlorophenol and showed an optically anisotropic melt phase in the range from 280° to 340° C.

We claim:
1. Thermotropic polyesterimide which consists essentially of units corresponding to the following formulae

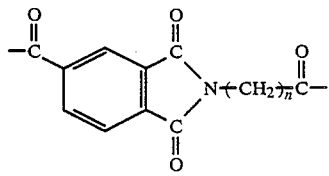 (I)

and

 (II)

with or without

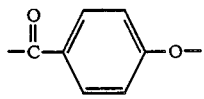 (III)

in which n is an integer of 3 to 12, Ar consists of 1,4-phenylene units or 4,4'-biphenylene units or mixtures thereof, up to 50 mol-% of these units being replaced by other $C_6$–$C_{18}$ divalent aromatic radicals or mixtures thereof, in which 50 to 100 mol-% of the chain-extending bonds are coaxially or parallel opposed and 50 to 0 mol-% angled and which are unsubstituted or substituted by $C_1$–$C_4$ alkoxy groups or halogen atoms, with the proviso that the molar ratio of III to I is 0 to 4.0 and the molar ratio of I to II is 0.95 to 1.05.

2. Polyesterimide as claimed in claim 1, characterized in that the molar ratio of III to I is 0 to 3.0.

3. Polyesterimide as claimed in claim 1, characterized in that the ratio of III to I is 0.5 to 3.0.

4. Polyesterimide as claimed in claim 1, characterized in that n is an integer of 5 to 10.

5. Polyesterimide as claimed in claim 1, characterized in that Ar consists exclusively of 1,4-phenylene units, 4,4'-bisphenylene units or mixtures thereof.

6. A molding, filament, fiber or film produced from the polyesterimide as claimed in claim 1.

7. A process for the production of the polyesterimide claimed in claim 1 by reaction of the dicarboxylic acids derived from the units I with diphenols and hydroxycarboxylic acids derived from the units II and III, or reactive derivatives thereof, in the presence or absence of catalysts, chain terminators and branching agents at temperatures of from 150° to 330° C. and at atmospheric or reduced pressure.

8. A process as claimed in claim 7, characterized in that the reaction is followed by solid-phase post-condensation.

* * * * *